(12) United States Patent
Hein et al.

(10) Patent No.: US 9,030,065 B2
(45) Date of Patent: May 12, 2015

(54) ELECTRONICALLY COMMUTATED ELECTRIC MACHINE

(75) Inventors: Bernd Hein, Baiersbronn/Schoenmuenzach (DE); Jerome Thiery, Strasbourg (FR); Christoph Heier, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 769 days.

(21) Appl. No.: 13/143,308

(22) PCT Filed: Nov. 2, 2009

(86) PCT No.: PCT/EP2009/064436
§ 371 (c)(1),
(2), (4) Date: Sep. 27, 2011

(87) PCT Pub. No.: WO2010/076062
PCT Pub. Date: Jul. 8, 2010

(65) Prior Publication Data
US 2012/0007456 A1    Jan. 12, 2012

(30) Foreign Application Priority Data
Jan. 2, 2009    (DE) .......................... 10 2009 000 010

(51) Int. Cl.
*H02K 5/24* (2006.01)
*H02K 5/15* (2006.01)
*H02K 5/128* (2006.01)
*F16J 15/06* (2006.01)

(52) U.S. Cl.
CPC ............... *H02K 5/128* (2013.01); *F16J 15/062* (2013.01); *H02K 5/24* (2013.01)

(58) Field of Classification Search
CPC ............ H02K 5/20; H02K 9/19; F16J 15/061
USPC ............... 310/89, 91; 277/644, 628, 630, 651
See application file for complete search history.

(56) References Cited

U.S. PATENT DOCUMENTS

| 4,311,317 | A  | * | 1/1982 | Bartels ........................ 220/304 |
| 7,196,438 | B2 | * | 3/2007 | Williams et al. ................ 310/51 |
| 7,549,205 | B2 |   | 6/2009 | Shafer |
| 2002/0157489 | A1 | * | 10/2002 | Murata et al. ...................... 74/6 |
| 2007/0069841 | A1 |   | 3/2007 | Kusano |
| 2008/0197731 | A1 | * | 8/2008 | Kusano ........................... 310/86 |
| 2008/0284112 | A1 |   | 11/2008 | Koch et al. |

FOREIGN PATENT DOCUMENTS

| EP | 0261542 A1 | 3/1988 |
| EP | 1429443 A1 | 6/2004 |

(Continued)

OTHER PUBLICATIONS

PCT/EP2009/064436 International Search Report.

*Primary Examiner* — Dang Le
*Assistant Examiner* — Leda Pham
(74) *Attorney, Agent, or Firm* — Michael Best & Friedrich LLP

(57) ABSTRACT

The invention relates to an electronically commutated electric machine (1), comprising a stator housing (3) which receives a stator (4) in a stator chamber (13) and which delimits a rotor chamber (14) receiving a rotor. According to the invention, the stator housing (3) comprises a main housing (31) and a cover (9), wherein an elastic sealing element (8) is arranged between the main housing (31) and cover (9) and extends into the inside of the stator housing (3) with at least one radial region (30) and forms a tolerance compensating element (19) acting on the stator (4).

16 Claims, 3 Drawing Sheets

(56) References Cited

FOREIGN PATENT DOCUMENTS

| | | | |
|---|---|---|---|
| EP | 1648025 | A1 | 4/2006 |
| FR | 1158578 | A | 6/1958 |
| WO | 03/055040 | A1 | 7/2003 |
| WO | 03/083311 | A2 | 10/2003 |
| WO | 2005-034309 | A1 | 4/2005 |
| WO | 2007/060066 | A1 | 5/2007 |
| WO | 2007/129205 | A2 | 11/2007 |

* cited by examiner

ELECTRONICALLY COMMUTATED ELECTRIC MACHINE

BACKGROUND OF THE INVENTION

The invention relates to an electronically commutated electric machine with a stator housing which receives a stator in a stator chamber and delimits the latter with respect to a rotor chamber receiving a rotor.

Electronically commutated, i.e. brushless, motors are increasingly used, in particular in automobile engineering. Brushless motors of this type are used, for example, as drives for water pumps. In particular in application cases of this type, motors of this type have a stator housing which receives a stator in a stator chamber provided for this purpose, wherein a delimitation with respect to a rotor chamber is provided; accordingly, the stator is completely enclosed and is partitioned off from the rotor and from the surroundings. In order to be able to fit arrangements of this type, the individual components have to have a certain amount of play. However, once installation is finished, the components are intended to be mounted in a play-free manner with respect to one another in order to achieve a vibration-free formation of the arrangement and in order to be able to avoid an increased noise level due to insufficient damping or rattling noises. In the prior art, this freedom from play is achieved only by complicated and not easily controllable additional measures, for example screwing, potting or adhesively bonding the individual components together. Although this can result in a play-free arrangement, the complete absence of play causes a problem for the thermal expansion of the components, in particular during long-term operation. The measures known in the prior art, such as, in particular, potting and adhesive bonding, are stressed over time due to the different thermal expansion of individual components and, in unfavorable cases, may fail over a relatively long operating period and, in particular, adhesive bonds or potting means may tear, as a result of which the arrangement may become untight, which may result in component failure.

SUMMARY OF THE INVENTION

It is the object of the invention to provide a solution which is cost-effective and easy to handle in terms of installation/process for the vibration-damping mounting of stators in electronically commutated electric machines of the type in question which permit very good sealing and freedom from play and at the same time compensate for component tolerances, in particular component tolerances due to different degrees of heating during operation.

For this purpose, an electronically commutated electric machine is proposed, with a stator housing which receives a stator in a stator chamber and delimits the latter with respect to a rotor chamber receiving a rotor. It is provided here that the stator housing comprises a basic housing and a cover, an elastic sealing element being arranged between the basic housing and cover, said sealing element protruding with at least one radial region into the interior of the stator housing and forming there a tolerance compensating element which acts on the stator. Accordingly, the stator is arranged in the stator housing, the stator housing comprising the basic housing and a cover closing the latter. The sealing element is arranged between the basic housing and the cover, said sealing element protruding at least in regions in the radial direction, namely with the radial region, into the interior of the stator housing and acting on the stator. This action upon the stator causes the stator to form the tolerance compensating element which compensates for component size play or fitting play of the stator in the stator housing. The stator is thereby held in a play-free manner in the closed housing.

In one embodiment, the tolerance compensating element acts on the stator in the axial direction. Accordingly, the stator has end sides, of which at least one is acted upon by at least one region of the tolerance compensating element in such a manner that the corresponding dynamic effect takes place in the axial direction of the stator. Accordingly, the dynamic effect is at least substantially in the axial direction of the rotor, as a result of which axial play (in particular length tolerance) is prevented.

In a preferred embodiment, the stator is an insertable stator which can be inserted axially into the stator housing. That means that the stator is premanufactured as a subassembly, in particular is premanufactured as a constructional unit with a coil former and, preferably, commutator electronics or activation electronics, wherein the stator can be introduced axially into the stator housing. Accordingly, in order to install the electric machine, the stator is pushed substantially in the axial direction into the stator housing and is held in the fitted position thereof there by preferably shape-matched receptacles and/or means for locking against rotation and is electronically contacted preferably via plug and socket connections provided there, wherein plug and socket connections of this type can reach through the stator housing to the outside for connection to an electrical system.

In one embodiment, the stator housing is of cup-shaped design. This means that the stator housing is substantially designed, for example, as a rotational body which has a closed bottom wall and side walls connected thereto, wherein a cover region is closed by the cover and the stator is placed into the cup interior formed in this manner.

In a further embodiment, the cover has a central cup region which protrudes into the interior of the stator. In this embodiment, the cover, for its part, is of substantially cup-shaped design, wherein a central cup region protrudes into the interior of the stator, for example reaches through the stator. The stator here is of substantially annular design, for example in the form of a coil ring.

In a further embodiment, the stator is supported on the stator housing at a stator seat. The stator seat here brings about a defined spatial arrangement of the stator, which is designed, for example, as a stator ring, in particular as an annular coil former with electronics placed thereon, as described above, in the stator housing. The stator seat here can comprise one or more planar regions or of individual fixing points which support the stator in particular axially and/or radially.

In one embodiment, the tolerance compensating element when not acted upon at least partially has an arc shape. This means that the tolerance compensating element is not planar and flat but rather is designed at least partially in the shape of an arc, i.e. has an arc height and an arc width here and permits the application of prestress.

In one embodiment, the tolerance compensating element when acted upon by the cover is reduced in its arc curvature. This means that the arc height is deformed when acted upon by the cover, on the one hand, and/or the stator, on the other hand, in such a manner that its arc curvature is reduced, i.e. the arc height is reduced. In this case, it may be possible, in a specific embodiment, for the arc width to be increased the more the arc curvature is decreased, i.e. the arc shape of the tolerance compensating element is stretched by the action thereupon, in particular in such a manner that the arc extends in the radial direction into the stator housing. However, it is also possible for the tolerance compensating element to be acted upon by the cover and to be reduced in its arc curvature, i.e. for the arc height to be reduced, wherein the tolerance compensating element is merely compressed in this arc curvature and is not stretched. Such stretching can be prevented, for example, by a stop running in the radial direction; the compression upon action with the cover is then absorbed by the material structure of the tolerance compensating element.

The sealing element is preferably designed as a sealing ring, i.e. as an encircling annular structure.

The sealing element particularly preferably has an sealing region for sealing off the stator housing from the cover. In this case, the sealing region of the sealing element is a section of the sealing element, the function of which essentially amounts to nothing more than sealing the stator housing. For this reason, the sealing region can be designed in such a manner that the specification thereof, in particular with regard to the expansion and material composition thereof, can be fully oriented to the sealing function.

The sealing region is preferably at least partially located in an annular groove of the stator housing. The sealing region here corresponds to, and is at least partially located in, the annular groove of the stator housing, in particular an encircling annular groove formed on the end side of the stator housing. It is in particular provided here that, in the closed state of the stator housing, i.e. when the cover rests thereon, the sealing region bears against at least two, preferably three, sides of the annular groove, in which reason the sealing region is preferably of enlarged design in the axial extent relative to the annular groove such that said enlarged design is compressed upon closing of the cover and acts upon the side walls of the annular groove in a sealing manner in the contact position. The annular groove in the stator housing is preferably formed on the basic housing.

In a preferred embodiment, the sealing region is of L-shaped design in cross section. One limb of the L-shaped design engages here in the annular groove or acts on another wall of the stator housing, in particular of the basic housing, in the axial direction, thus forming at least two contact surfaces which run substantially transversely with respect to each other and act in a sealing manner. As described above, in the L-shaped design, the limb engaging in the annular groove is preferably of enlarged design relative to the depth of the annular groove, and therefore, when the stator housing is closed with the cover, said limb is compressed and the sealing region is contacted preferably on three sides within the annular groove.

Furthermore, it is proposed, as a particularly preferred embodiment, for the sealing ring to have the shape of a "5" in cross section, wherein the L-shaped design of the sealing region directly adjoins the arcuate design of the tolerance compensating element and produces the cross-sectional contour here of the (Arabic) number 5.

BRIEF DESCRIPTION OF THE DRAWINGS

The invention is explained in more detail below with reference to an exemplary embodiment but without being restricted thereto.

In the figures

DETAILED DESCRIPTION

Figure 1:
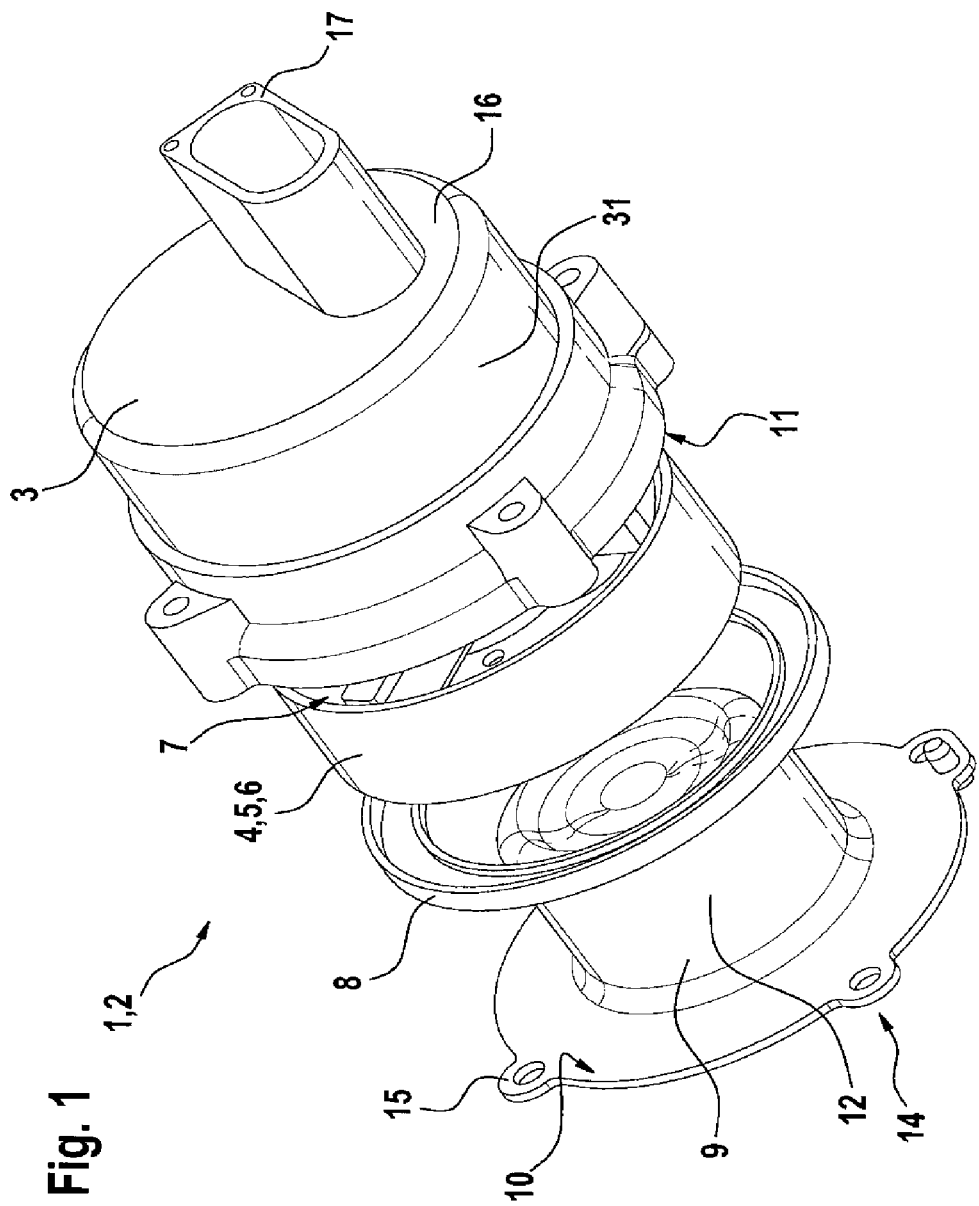
FIG. 1 shows an electric machine with a coil former, sealing element and cup-shaped cover in a component illustration.

FIG. 1 shows, in a component illustration, an electronically commutated electric machine 1, namely an electric motor 2, with a stator housing 3 which is of substantially cup-shaped design in order to receive a stator 4, wherein the stator 4 is designed as a ring stator 5 and as an insertable stator 6 which can be inserted axially into the stator housing 3, and wherein the stator 4 has stator electronics 7 undertaking the electronic commutation of a supply DC voltage. The stator housing 3, namely a basic housing 31 which receives the stator 4, and the (pushed-in) stator 4 are assigned an elastic sealing element 8 which, in order to provide a seal between the basic housing 31 and a cover 9 closing the basic housing 31, is provided lying annularly for contact both with a cover connecting region 10 and with a housing connecting region 11 which faces the latter and substantially corresponds in shape thereto. The cover 9 has a central cup region 12 which reaches through both the elastic sealing element 8 and the stator 4, namely the ring stator 5, and at least partially protrudes into the stator 4. In the closed state of the stator housing 3, i.e. if a stator chamber 13 provided in the stator housing 3 for receiving the stator 4, is closed, a rotor chamber 14 for receiving a rotor (not illustrated) of the electric machine 1 is formed in that cup region 12 of the cover 9 which is now open outward toward the surroundings, wherein the rotor, by being inserted in the rotor chamber 14 of the cup region 12 which engages in the stator 4, is surrounded by the stator 4 and by an alternating magnet field (not illustrated) which is formed by the stator during operation. The cover 9 and the stator housing 3 are connected here via a screw connection 15 such that the enclosed stator 4 is accessible for servicing. On the closed cup base side 16 opposite the cover, the stator housing 3 has a plug element 17 for bringing about electrical connections (not illustrated) of the stator 4 and the stator electronics 7.

Figure 2:
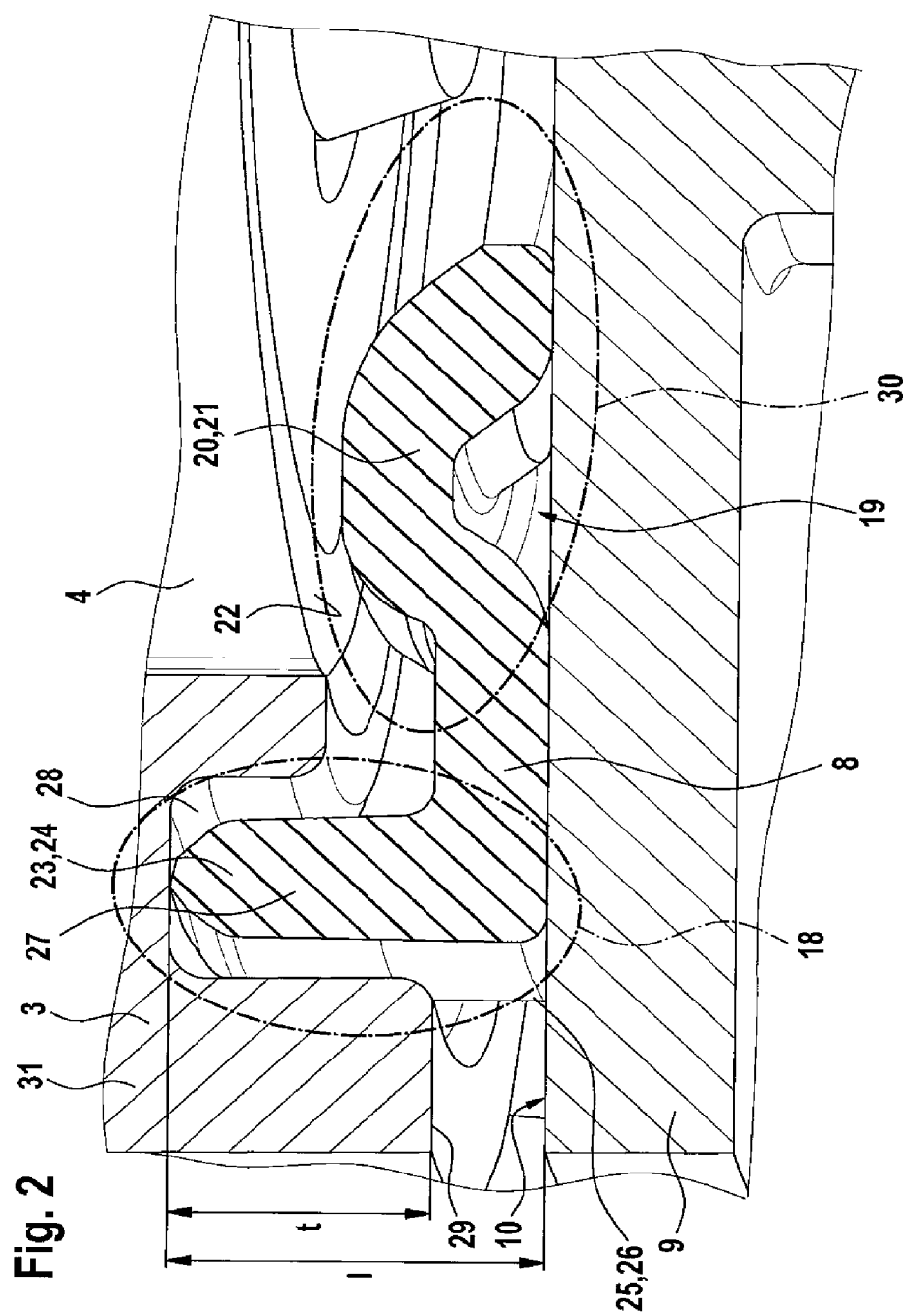
FIG. 2 shows the sealing element in the fitted position directly before the cover is closed.

FIG. 2 shows, partially in cross section, the cover 9 in the cover connecting region 10 with the sealing element 8 inserted and stator 4 inserted directly before connection of the cover 9 and basic housing 31, i.e. before the stator housing 3 is closed by the cover 9. The elastic sealing element 8 has the shape of a "5" in cross section, with a sealing region 18 of L-shaped design and a tolerance compensating element 19 which adjoins the sealing region 18 of L-shaped design, forms an edge region 30 and has an arc shape 20, wherein the arc shape 20 follows branching off inward from the sealing region 18 in the radial direction and thereby forms the radial region 30. The arc shape 20 of the tolerance compensating element 19 here has an arc curvature 21 which lies in the region of the stator 4, namely in the region of the stator end side 22 thereof facing the cover 9. In this case, the sealing element 8 is formed from an elastic material 23, in particular an elastomer 24, and has an annular shape 25, i.e. is designed as a sealing ring 26. The L-shaped sealing region 18 here has a limb 27 which is extended substantially transversely with respect to the arc shape 20 of the tolerance compensating element 19 (i.e. lies in the axial direction of the stator housing 3) and engages in an encircling annular groove 28 which is placed into a housing end side 29 of the stator housing 3. The limb 27 here has a length l, wherein the length l is longer than a depth t of the annular groove 28, but the annular groove 28 is designed to be wider than the width of the limb 27 located therein.

Figure 3:
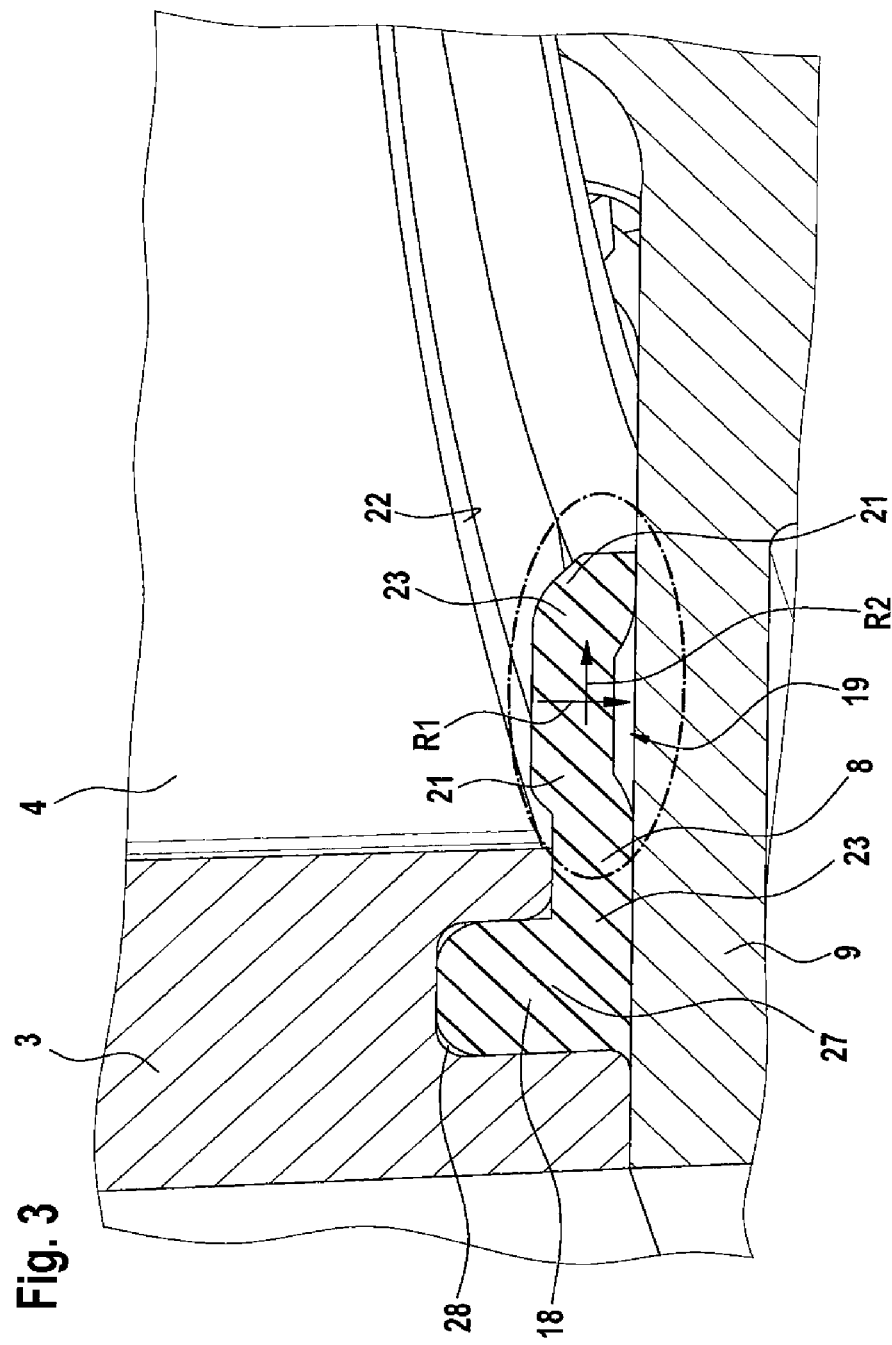
FIG. 3 shows the sealing element after the cover is closed.

FIG. 3 shows, in cross section, substantially the same detail as FIG. 2, the stator housing 3 and the cover 9 now being in a contact position against each other, i.e. the stator housing 3 is consequently closed with the cover 9. The elastic sealing element 8 has been deformed by the geometry described above with regard to FIG. 2, and therefore the limb 27 now substantially completely fills the width of the annular groove 28 since the length l of said limb (compare FIG. 2) exceeds the depth t of the annular groove 28 (compare FIG. 2); by the stator housing 3 and cover 9 being joined together axially with action upon the limb 27 of the elastic sealing element 8, the elastic material 23 of said sealing element has been deformed in the region of the limb 27 in such a manner that it now substantially completely fills the annular groove 28. At the same time, the stator 4 acts with the stator end side 22 thereof on the arc curvature 21 of the tolerance compensating element 19 which is formed integrally with the sealing region 18 of the sealing element 8 (compare FIG. 2). The elastic material 23 of said sealing element is also deformed by, namely, the arc curvature 21 being reduced in its arc height by action thereupon with the stator end side 22, i.e. being compressed in the direction of the cover 9 (compare arrow R1 essentially in the axial direction). At the same time, a slight radial displacement inward in the direction of the arrow R2 can take place; the stator 4 is thereby held under prestress in the stator housing 3 and pushed against a stator seat (not illustrated) which is arranged on the inside of the stator housing 3 in the region of the cup base side 16; vibration or shaking, in particular upon acceleration by operation of the electric machine 1, is thereby avoided. At the same time, a very good seal relative to the environment is produced by the sealing element 8 in the sealing region 18 since the outer walls of the limb 27 substantially completely fill the encircling annular groove 28 and consequently bear against inner walls of the annular groove 28.

The invention claimed is:

1. An electronically commutated electric machine (1) comprising:
    a stator housing (3) which receives a stator (4) in a stator chamber (13) and delimits the stator chamber with respect to a rotor chamber (14) receiving a rotor, characterized in that the stator housing (3) comprises a basic housing (31) and a cover (9),
    an elastic sealing element (8) having the shape of a "5" in cross section and including a sealing region (18) having an L-shaped design in cross section arranged between the basic housing (31) and the cover (9), for sealing off the stator housing (3) from the cover (9), and a tolerance compensating element (19) having an arcuate shaped design in cross section, wherein the tolerance compensating element (19) of said sealing element protrudes with at least one radial region (30) into an interior of the stator housing (3) to form the tolerance compensating element (19) which presses upon the stator (4),
    wherein the sealing region (18) includes a first limb (27) extended in an axial direction of the stator housing (3) and received within an annular groove (28) of the stator housing (3), and
    wherein the tolerance compensating element (19), when not pressing on the stator (4), at least partially has an arc shape (20) in cross section, and when compressed between the stator (4) and the cover (9), an arc curvature (21) of the arc shape (20) which is in contact with the stator (4) is reduced in arc height.

2. The machine (1) as claimed in claim 1, characterized in that the tolerance compensating element (19) presses upon the stator (4) in the axial direction.

3. The machine (1) as claimed in claim 1, characterized in that the stator (4) is an insertable stator (6) which is inserted axially into the stator housing (3).

4. The machine (1) as claimed in claim 1, characterized in that the stator housing (3) is of cup-shaped design.

5. The machine (1) as claimed in claim 1, characterized in that the cover (9) has a central cup region (12) which protrudes into an interior of the stator (4).

6. The machine (1) as claimed in claim 1, characterized in that the stator (4) is supported on the stator housing (3) at a stator seat.

7. The machine (1) as claimed in claim 1, characterized in that the sealing element (8) is designed as a sealing ring (26).

8. The machine (1) as claimed in claim 2, characterized in that the stator (4) is an insertable stator (6) which is inserted axially into the stator housing (3).

9. The machine (1) as claimed in claim 8, characterized in that the stator housing (3) is of cup-shaped design.

10. The machine (1) as claimed in claim 9, characterized in that the cover (9) has a central cup region (12) which protrudes into an interior of the stator (4).

11. The machine (1) as claimed in claim 10, characterized in that the stator (4) is supported on the stator housing (3) at a stator seat.

12. The machine (1) as claimed in claim 11, characterized in that the sealing element (8) is designed as a sealing ring (26).

13. The machine (1) as claimed in claim 2, characterized in that the tolerance compensating element (19) further presses upon the stator (4) in a radial direction so that the stator is held in prestress both axially and radially.

14. The machine (1) as claimed in claim 1, wherein the first limb (27) of the sealing region (18) has a length (I) in the axial direction that is greater than a depth (t) of the annular groove (28) in the axial direction, and the annular groove (28) is wider than the first limb (27) in a direction perpendicular to the axial direction.

15. The machine (1) as claimed in claim 1, wherein the sealing region (18) includes an additional limb extended in a direction transverse to the axial direction, the additional limb integrally interconnecting the first limb (27) and the tolerance compensating element (19).

16. The machine (1) as claimed in claim 15, wherein the additional limb is compressed between an end of the basic housing (31) and the cover (9) when the cover (9) is secured to the stator housing (31).

* * * * *